(12) United States Patent
Wang et al.

(10) Patent No.: US 9,322,345 B2
(45) Date of Patent: *Apr. 26, 2016

(54) ELECTRIC ACTUATOR TEMPERATURE ESTIMATION

(71) Applicant: Ford Global Technologies, LLC, Dearborn, MI (US)

(72) Inventors: Yan Wang, Ann Arbor, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/250,105

(22) Filed: Apr. 10, 2014

(65) Prior Publication Data

US 2015/0292420 A1 Oct. 15, 2015

(51) Int. Cl.
*F02D 23/00* (2006.01)
*F02D 35/00* (2006.01)
*F02D 41/00* (2006.01)
*F02B 37/18* (2006.01)
*F02D 41/18* (2006.01)
*F02D 11/10* (2006.01)

(52) U.S. Cl.
CPC .......... *F02D 35/0007* (2013.01); *F02B 37/186* (2013.01); *F02D 41/0007* (2013.01); *F02D 41/18* (2013.01); *F02D 2011/102* (2013.01); *F02D 2200/0406* (2013.01); *Y02T 10/144* (2013.01)

(58) Field of Classification Search
CPC ...... F02B 37/183; F02B 37/186; F02B 37/22; F02D 35/0007; F02D 41/0007; F02D 2011/102; F02D 2200/0406; F02D 41/18
USPC ..................................................... 60/600, 602
See application file for complete search history.

(56) References Cited

U.S. PATENT DOCUMENTS

| 7,006,911 | B2 | 2/2006 | Wilhelm et al. |
| 8,001,782 | B2 * | 8/2011 | Pursifull ......................... 60/612 |
| 2005/0092949 | A1 | 5/2005 | Wilhelm et al. |
| 2012/0001111 | A1 * | 1/2012 | Takeda et al. ................. 251/231 |
| 2012/0306422 | A1 | 12/2012 | Hao et al. |
| 2012/0330483 | A1 | 12/2012 | Campbell et al. |
| 2013/0312406 | A1 * | 11/2013 | Landsmann .................... 60/602 |

OTHER PUBLICATIONS

Gale, Allan R. et al., "Turbocharger Arrangement and Set of Feedbacks for Electric Actuator Control," U.S. Appl. No. 13/674,844, filed Nov. 12, 2013, 31 pages.

* cited by examiner

*Primary Examiner* — Thai Ba Trieu
*Assistant Examiner* — Brandon Lee
(74) *Attorney, Agent, or Firm* — Julia Voutyras; Alleman Hall McCoy Russell & Tuttle LLP (57) ABSTRACT

Various methods for estimating electric actuator temperature during certain operational windows are provided. In one example, a method comprises adjusting an electric motor to position a wastegate at a desired wastegate position, while during selected conditions, deviating from the desired position by at least one full half-turn of the motor and indicating motor temperature based on winding resistance averaged over the full half-turn.

20 Claims, 6 Drawing Sheets

ELECTRIC ACTUATOR TEMPERATURE ESTIMATION

FIELD

The field of the disclosure relates to control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as an electric motor, for example.

In some scenarios, the electric motor may be exposed to high surrounding temperatures due to proximate flow of exhaust gasses, and may exhibit high temperatures itself, for example due to the continuous reception of high electrical currents—e.g., during operating conditions in which high or maximum boost is continually desired. As such, estimation of the electric motor temperature may be desired to avoid degraded motor operation and potential motor degradation.

U.S. Pat. App. No. 2013/0312406 describes a method for controlling an electric actuator for a wastegate valve arrangement of an exhaust gas turbocharger. In particular, a temperature of the electric actuator may be estimated from an engine voltage supplied to the actuator and its operating current based on a calculation model.

U.S. Pat. No. 7,006,911 describes a system for estimating the temperature of an electric actuator. In one example, the electric actuator temperature is estimated based in part on a resistance temperature coefficient which represents a motor winding resistance.

The inventors herein have recognized several issues with such approaches. First, estimates of the temperature of an electric motor based on voltage and currents supplied to the motor may be inaccurate and in some scenarios may result in underestimating the temperature, which could lead to degraded motor operation and thus degraded boost control. Second, motor temperature estimates that use a single winding resistance may also result in inaccurate temperature estimation and thus potentially degraded motor control, as winding resistance in an electric motor is dependent on rotor position.

As such, measurement of the winding resistance of an electric motor at multiple rotor positions may increase the accuracy of motor temperature estimation. However, the rotor will undergo frequent rotation under typical operating conditions, making measurement at multiple positions impractical as a non-negligible finite duration (e.g., 100 ms) may be required for a single winding resistance measurement.

Methods for estimating electric actuator temperature during certain operational windows are thus provided.

In one example, a method comprises adjusting an electric motor to position a wastegate at a desired wastegate position, while during selected conditions, deviating from the desired position by at least one full half-turn of the motor and indicating motor temperature based on winding resistance averaged over the full half-turn.

In a more specific example, the selected conditions include maximum boost in which the wastegate is placed at a fully closed position.

In another aspect of the example, the selected conditions include minimum boost in which the wastegate is placed at a fully open position.

In yet another aspect of the example, during the selected conditions the desired wastegate position is a constant partial lift.

In still further another aspect of the example, the method further comprises if the motor temperature exceeds a threshold, reducing current supplied to the motor.

In the examples described above, the accuracy of electric actuator temperature estimation may be increased, which may increase the accuracy of, and avoid degradation of, operation of the electric actuator. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, some internal combustion engines may use a compression device such as a turbocharger to increase the flow of air into the engine and thus increase torque/power output. The pressure delivered to the intake manifold, hereinafter referred to as "boost" or "boost pressure" may be controlled by adjusting the amount of gas reaching a turbine of the turbocharger, for example via a wastegate. An actuator, such as an electric actuator (e.g., electric motor) may be operatively coupled to a valve of the wastegate and driven to position the wastegate anywhere between a fully open position and a fully closed position to achieve the desired boost based on operating conditions.

In some scenarios, the electric actuator may be subject to high temperatures due to high proximate exhaust gas temperatures and the continuous application of electrical current, for example during conditions when maximum boost is continuously requested and the wastegate valve is accordingly maintained at its seat. Accordingly, determining the temperature of the actuator may be desired to prevent degraded operation of the actuator and thus degraded boost control.

In the example that the electric actuator is an electric motor, the temperature of the motor may be estimated based on an engine voltage supplied to the motor and its operating current. In other approaches, the temperature may be estimated based in part on a resistance coefficient which represents a motor winding resistance.

However, temperature estimation of the electric motor based on voltage and currents supplied to the motor may be inaccurate and in some scenarios may result in underestimation of the temperature, which could lead to degraded motor operation and degraded boost control. Moreover, temperature estimates that use a single winding resistance may also result in inaccurate temperature estimation and thus potentially degraded motor operation, as winding resistance in an electric motor is dependent on rotor position.

As such, measurement of the winding resistance of an electric motor at multiple rotor positions may increase the accuracy of motor temperature estimation. However, the rotor will undergo frequent rotation under typical operating conditions due to frequent variation in desired boost, making measurement at multiple positions impractical as a non-negligible finite duration (e.g., 100 ms) may be required for a single winding resistance measurement.

Figure 1:
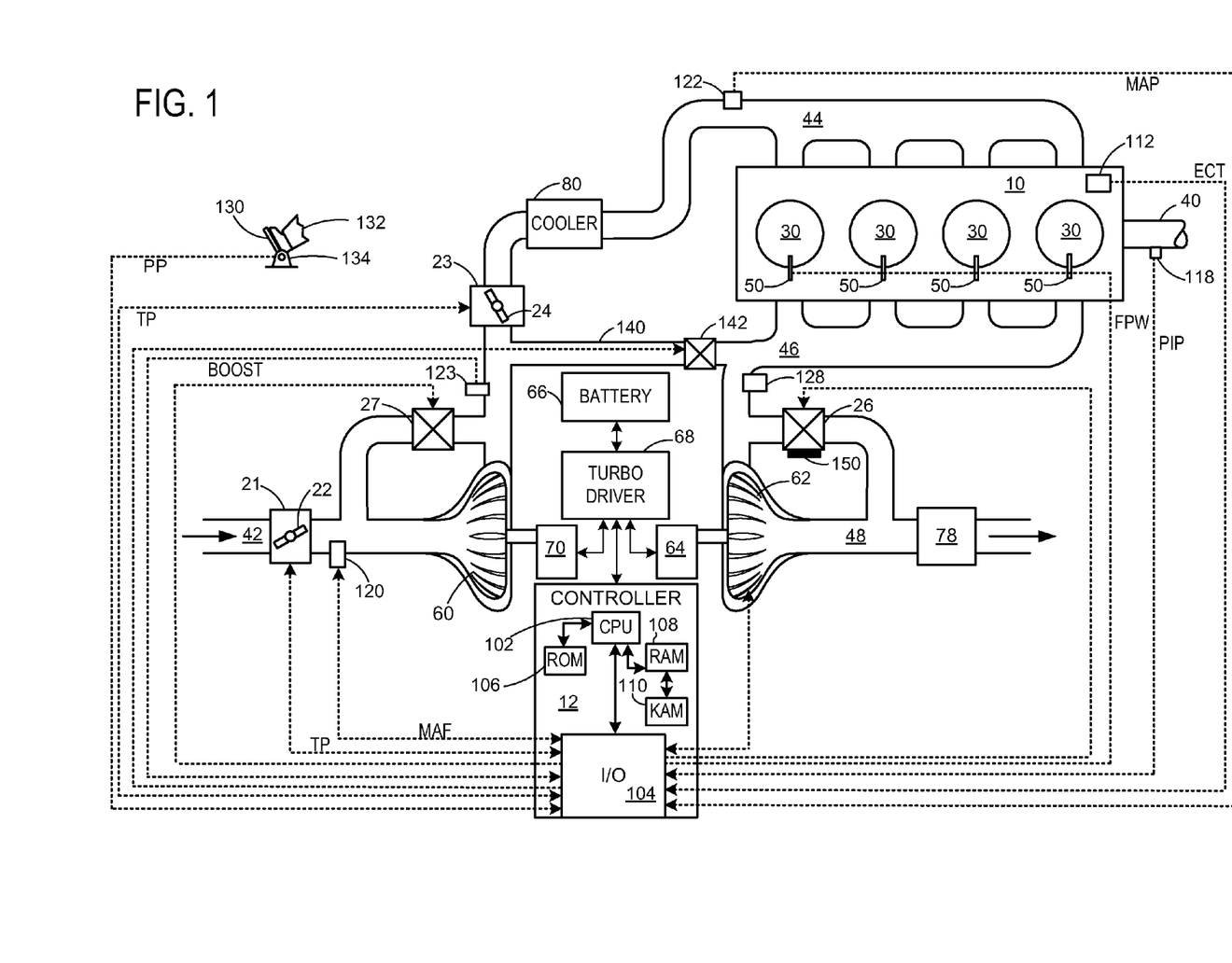
FIG. 1 shows a block diagram of a turbocharged engine including a wastegate.
Figure 2:
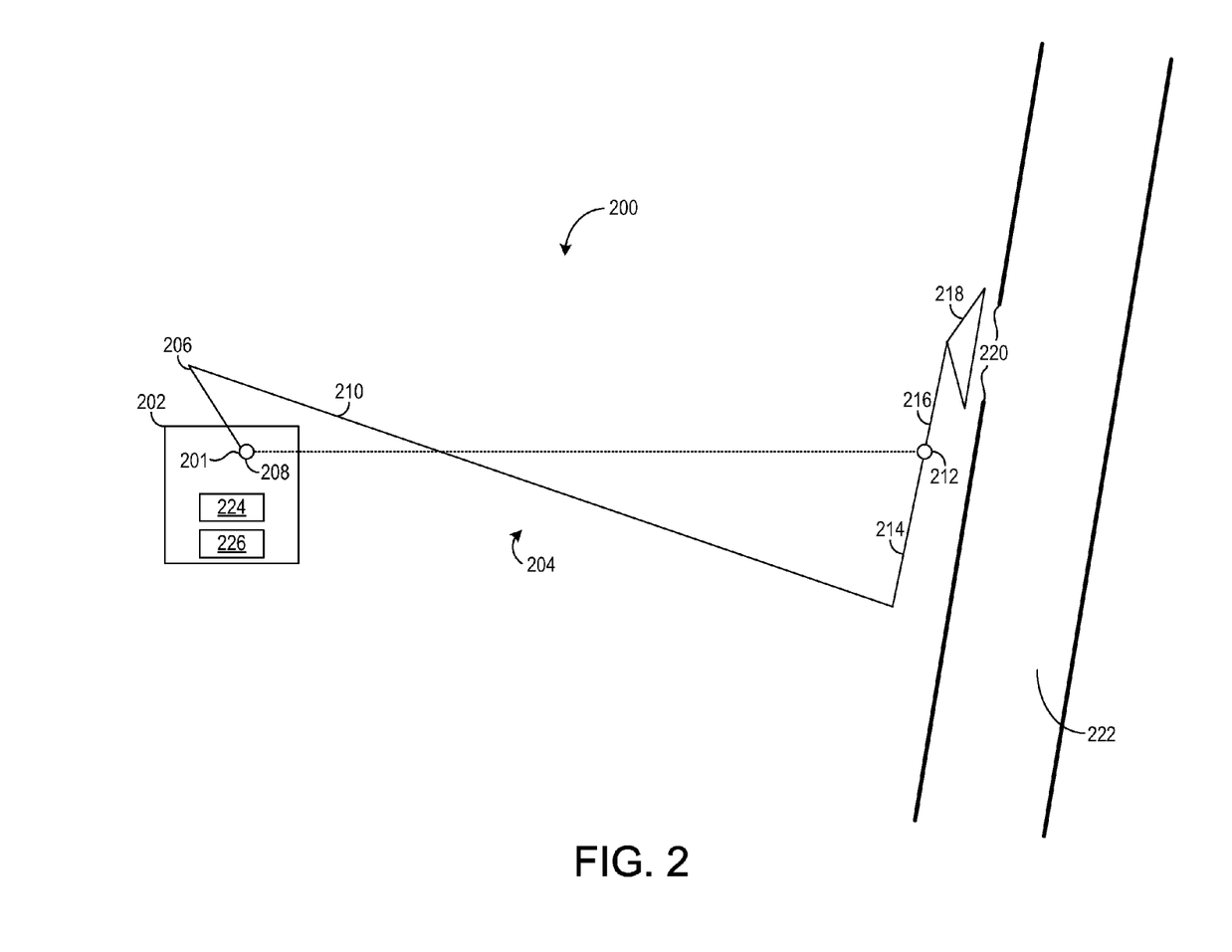
FIG. 2 shows an exemplary wastegate arrangement of the wastegate of FIG. 1.
Figure 3A:
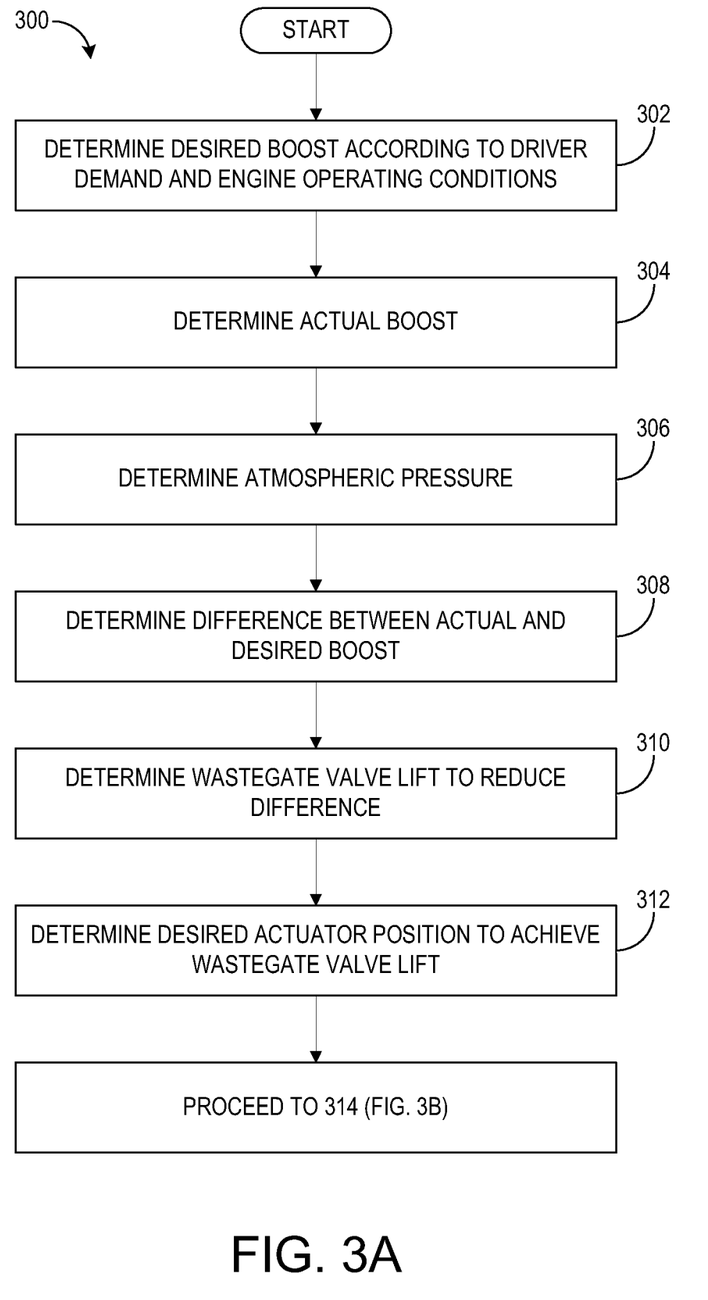
FIGS. 3A & 3B show a flowchart illustrating a method for controlling a turbocharger associated with the wastegate arrangement of FIG. 2.
Figure 3B:
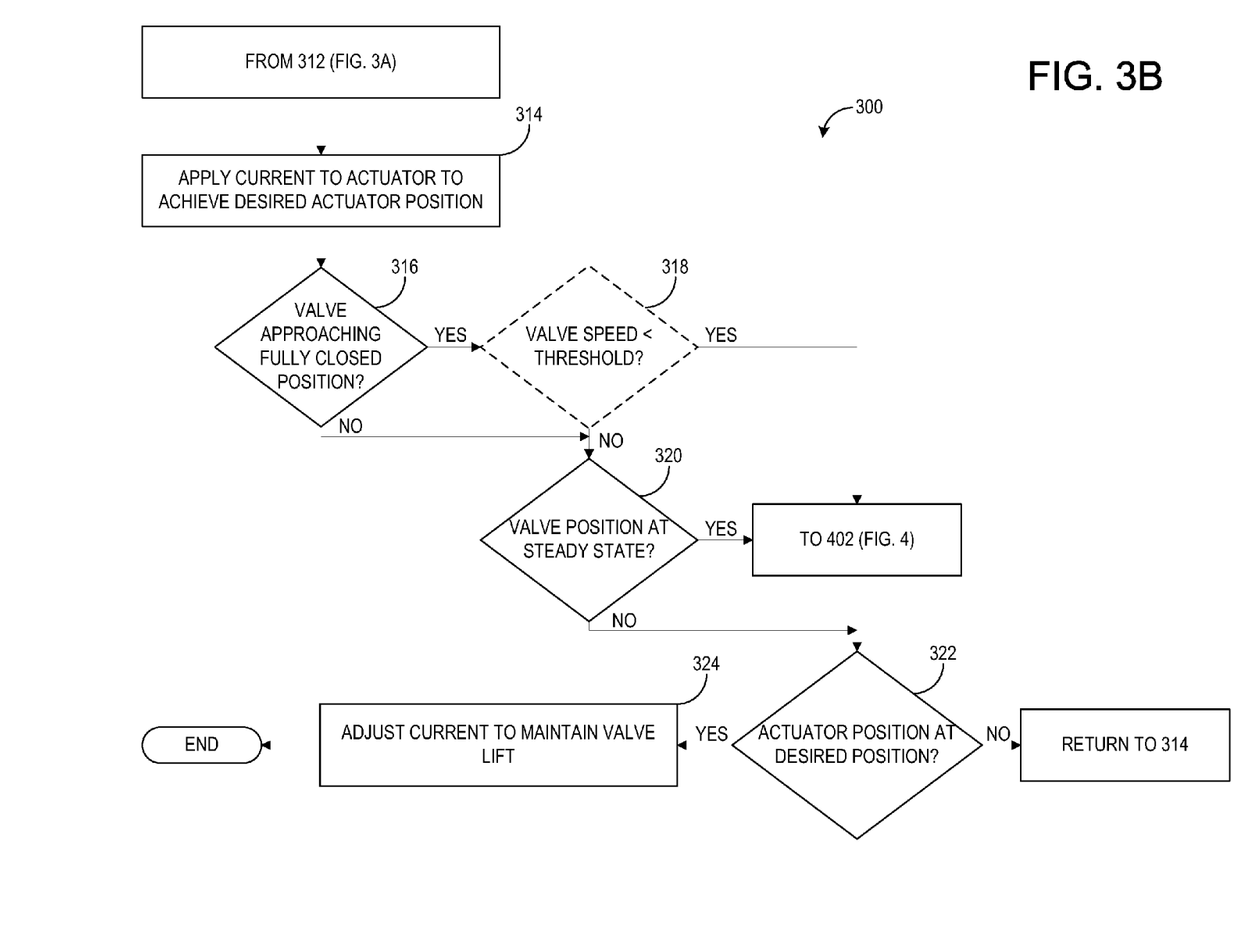
Figure 4:
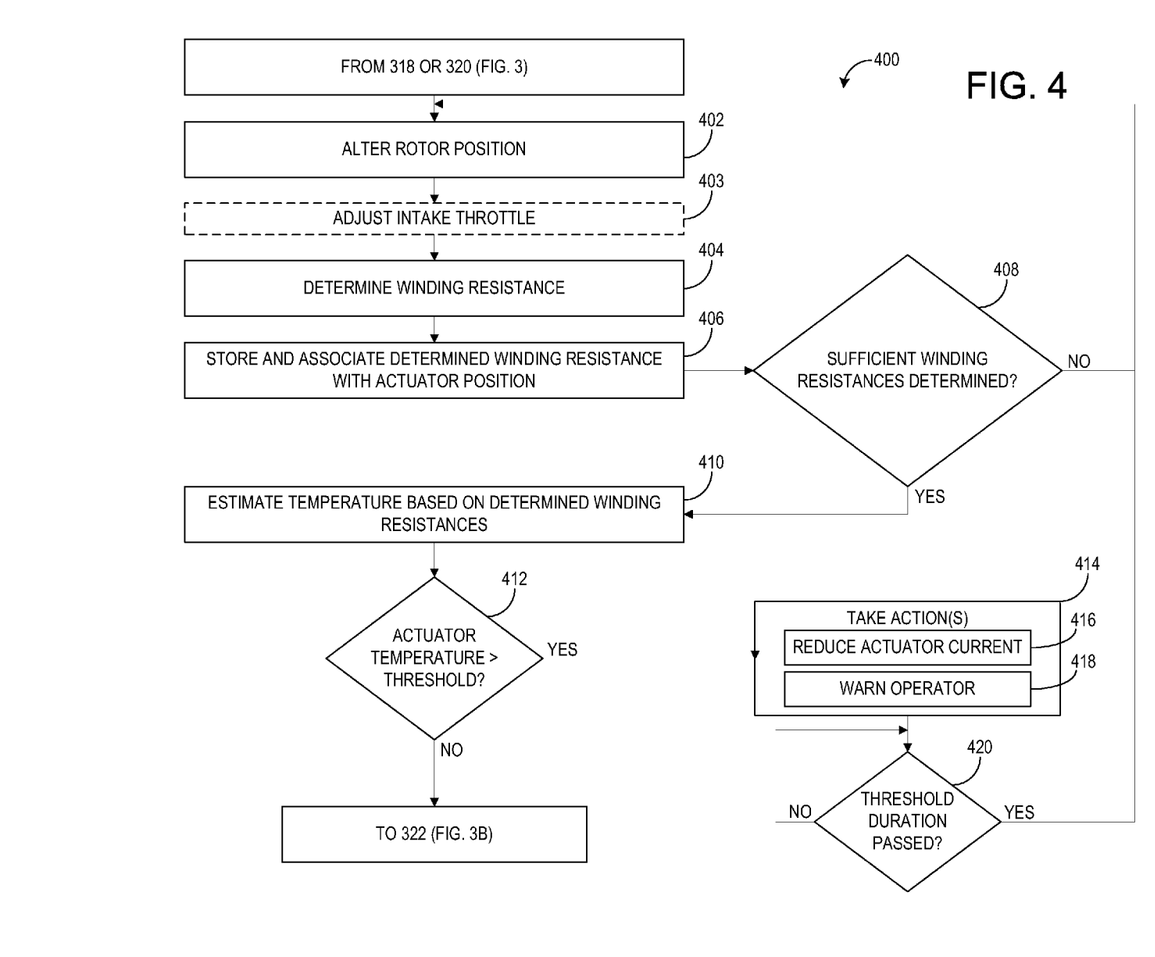
FIG. 4 shows a flowchart illustrating a method for determining the temperature of an actuator of the wastegate arrangement of FIG. 2.
Figure 5:
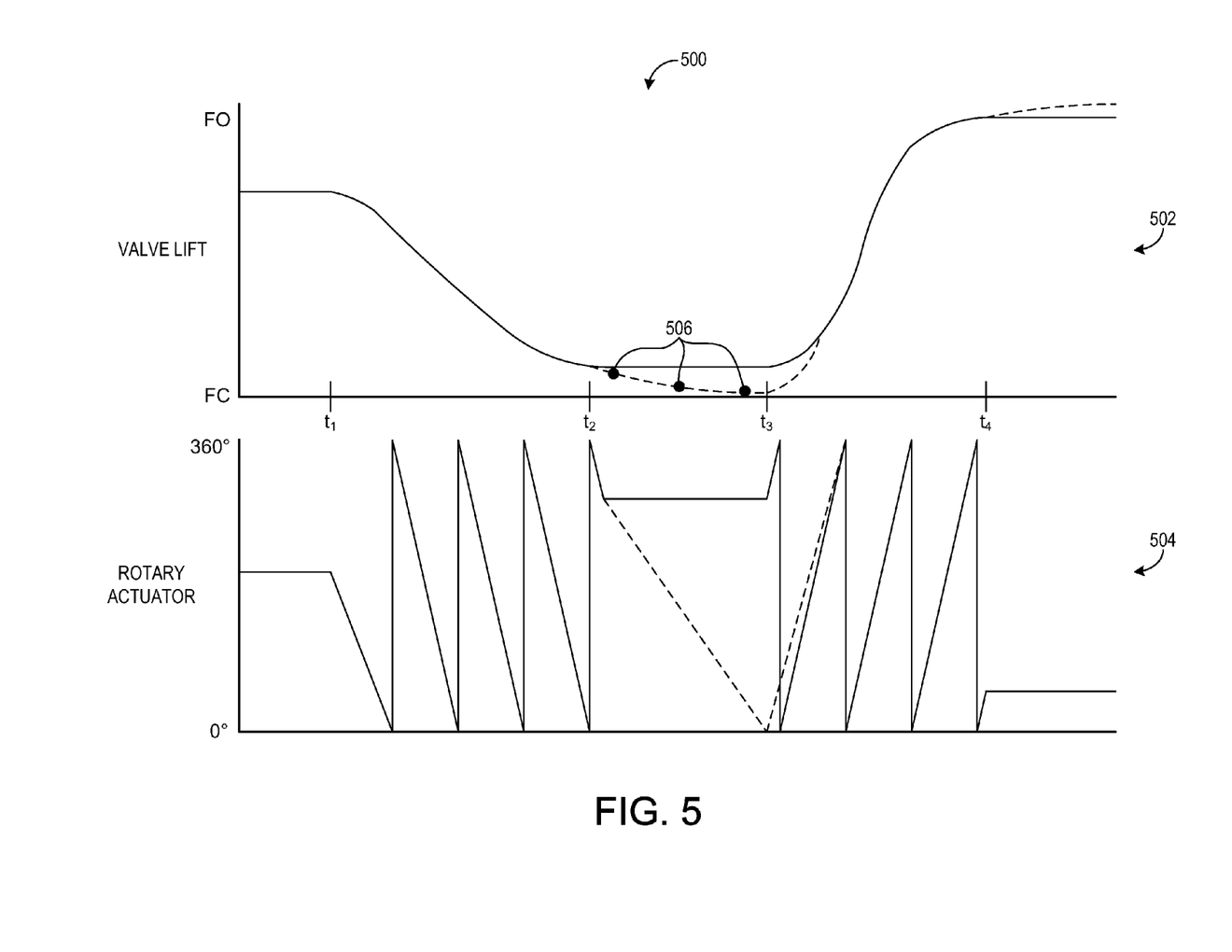
FIG. 5 shows a graph illustrating operating parameters of the wastegate arrangement of FIG. 2 operated according to the methods of FIGS. 3A, 3B, and 4 for an exemplary drive cycle.

Various methods for estimating electric actuator temperature during certain operational windows are thus provided. In one example, a method comprises adjusting an electric motor to position a wastegate at a desired wastegate position, while only during selected conditions, deviating from the desired position by at least one full turn of the motor and indicating motor temperature based on winding resistance averaged over the full turn. FIG. 1 shows a block diagram of a turbocharged engine including a wastegate, FIG. 2 shows an exemplary wastegate arrangement of the wastegate of FIG. 1, FIGS. 3A & 3B show a flowchart illustrating a method for controlling a turbocharger associated with the wastegate arrangement of FIG. 2, FIG. 4 shows a flowchart illustrating a method for determining the temperature of an actuator of the wastegate arrangement of FIG. 2, FIG. 5 shows a graph illustrating operating parameters of the wastegate arrangement of FIG. 2 operated according to the methods of FIGS. 3A, 3B, and 4 for an exemplary drive cycle. The engine of FIG. 1 also includes a controller configured to carry out the methods depicted in FIGS. 3A, 3B, and 4.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator including an electric motor, and in particular a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust manifold 46 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be controlled via actuation of actuator 202 and placement of its output shaft 201, movements of which may be translated to the exhaust valve via linkage 204.

As shown, wastegate 200 further includes a position sensor 224 that may be configured to measure the angle of output shaft 201 to estimate the location of wastegate valve 218. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. In any case, a measurement by position sensor 224 may be used to determine the opening of wastegate valve 218, and particularly the distance from the top surface of valve seat 220 to the bottom surface of wastegate valve 218. In other embodiments, however, the position of wastegate valve 218 may be determined based on a soft sensor using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance, if these two quantities are known or can be measured. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

As described in further detail below, the winding resistance of actuator 202 may be determined at various rotor positions throughout a range of rotor positions (e.g., a 360° range), which may then be used to estimate the temperature of actuator 202, with various actions taken if the temperature exceeds a threshold. Taking multiple winding resistance measurements at different rotor positions in this way may increase the accuracy of temperature estimation of actuator 202, as winding resistance may be dependent on rotor position in an electric motor. A particular winding resistance may be determined in various suitable manners, including but not limited to measuring the voltage and current supplied to actuator 202. Current sensing may be facilitated via the current sensor or probe described above, for example.

FIGS. 3A and 3B show a flowchart illustrating a method 300 for controlling a turbocharger associated with wastegate arrangement 200 of FIG. 2. Method 300 may be executed by an engine controller (e.g., controller 12 of FIG. 1) and utilized to control a turbocharger via a wastegate (e.g., wastegate 200 of FIG. 2). Wastegate actuator 202 of FIG. 2 in particular may be used to actuate the wastegate. In one example, a method of controlling the turbocharger via the wastegate may comprise determining a desired boost pressure and an actual boost pressure. The wastegate may be adjusted according to a difference between the desired boost pressure and the actual boost pressure.

At 302, the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 304 of the method, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as based on MAP and RPM, for example.

Next, at 306 of the method, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 308 of the method, a difference between the actual and desired boost is determined. The engine controller may determine the difference, for example. In some examples, the difference may be determined by subtracting the desired boost from the actual boost.

Next, at 310 of the method, a wastegate valve lift is determined in order to reduce the difference between the actual and desired boost determined at 308. In some examples, the difference between the actual and desired boost, in addition to the current wastegate valve lift (e.g., sensed via position sensor 224), is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 312 of the method, a desired actuator position is determined to achieve the wastegate valve lift determined at 310. The desired actuator position may be fed as an input to various suitable control mechanisms including those described above. In some embodiments, a desired actuator orientation may be alternatively determined, such as the rotational orientation of a rotating component in the actuator.

Next, at 314 of the method, current is applied to the actuator to achieve the desired actuator position. A suitable voltage-to-current conversion mechanism may convert a voltage generated by the engine controller to generate the current.

Next, at 316 of the method, it is determined whether the wastegate valve is approaching the fully closed position—e.g., whether the wastegate valve is approaching its valve seat (e.g., valve seat 220 of FIG. 2). If it is determined that the wastegate valve is approaching the fully closed position (YES), the method proceeds to 316. If it is determined that the wastegate valve is not approaching the fully closed position (NO), the method proceeds to 318. It will be noted that scenarios in which the valve is not approaching the fully closed position may include those in which the valve is moving away from the fully closed position (e.g., toward the fully open position), or those in which the valve is moving toward the fully closed position but will not reach the fully closed position (e.g., a desired wastegate valve lift at which the valve is to be placed does not correspond to the fully closed position).

Next, at 318 of the method, it may optionally be determined whether the speed at which the wastegate valve is approaching the fully closed position is below a threshold speed. If it is determined that the valve speed is below the threshold (YES), the method proceeds to 402 of method 400 shown in FIG. 4. Here, valve speed below a threshold may afford an opportunity to determine winding resistance of the wastegate actuator at multiple rotor positions according to method 400, as, in some examples, the actuator resistance may correspond to the following relation: $R=(1/i(V-L*(di/dt)+K*s)$, where R is the winding resistance, i is the electrical current supplied to the actuator, V is the actuator voltage, L is the winding inductance, t is time, K is a constant, and s is the valve speed. Thus, at valve speeds below the threshold, the final term (K*s) of the aforementioned relation may become negligible. Under such conditions, the electrical current may be close to steady state, and thus (di/dt) may be become negligible, making the relation R=V/i. Accordingly, the winding resistance may be determined if V and i can be measured or determined. In addition, averaging V and i during a short period of time may yield better estimation of R as noise in the V and i measurements will be mitigated. In some embodiments, this simplification of winding resistance estimation may be employed in scenarios where the valve is not approaching the fully closed position. In other examples, however, winding resistance may be determined at valve speeds above the threshold by estimating the (L*(di/dt)) and (K*s) if constant K and inductance L are known. Method 300 may be accordingly modified for this possibility such that higher valve speeds do not prevent the method from proceeding to 402 of method 400. If, however, in method 300 depicted in FIG. 3 the valve speed is not below the threshold, the method proceeds to 320.

At 320 of the method, it is determined whether the wastegate valve position corresponds to steady state—e.g., whether the valve position is constant. The valve position may be at the fully closed position, fully open position, or at any partial lift therebetween. If it is determined that the valve position corresponds to steady state (YES), the method proceeds to 402 of method 400 shown in FIG. 4 where the valve position may be slightly varied from an otherwise commanded lift to facilitate winding resistance determination at multiple rotor positions. The slight variation in valve position may facilitate winding resistance determination throughout a full rotational range of the rotor of the wastegate actuator without unacceptably affecting boost, however. If it is determined that the valve position does not correspond to steady state (NO), the method proceeds to 322. Under certain conditions, especially when there is no boost request, the wastegate valve may be requested to move to an at least partially open position but at a low speed so that the resistance measurement described herein may be activated for the purpose of temperature estimation.

Other entry conditions may prompt execution of method 400. For example, scenarios in which the desired wastegate position changes by less than a threshold over a full rotation (e.g., 360°) of the wastegate actuator may prompt entry to method 400. In some examples, such conditions may further include the full rotation being at a speed less than a threshold.

Turning now to FIG. 4, a flowchart illustrating a method 400 for determining the temperature of wastegate actuator 202 of wastegate arrangement 200 of FIG. 2 is shown. Method 400 may be executed by engine controller 12 of FIG. 1, for example.

Proceeding from 318 or 320 of method 300 shown in FIG. 3, at 402 of the method, the rotor position (e.g., angular orientation) of the wastegate actuator is altered. In some examples, the engine controller may issue an altered actuator position to the wastegate actuator to thereby alter the rotor position. As described in further detail below, the rotor position may be adjusted in various suitable amounts (e.g., angles).

It is noted that the wastegate actuator has a time constant much faster than that of boost control. Therefore, most likely the variation of the wastegate actuator from its commanded position does not affect the boost level. However, 403 of the method may be utilized, where an intake throttle may be optionally adjusted to compensate variation in boost levels caused by deviation from the desired wastegate position to the altered wastegate position. Intake throttle 21 and/or 23 of FIG. 1 may be varied, for example. In some scenarios, intake throttle adjustment may include increasing opening of the throttle if the altered wastegate position increases the opening of the wastegate valve, and vice versa.

Next, at 404 of the method, the winding resistance of the wastegate actuator is determined. As described above, in some examples the winding resistance may be determined by measuring the voltage and current supplied to the actuator and dividing the voltage by the current. In other scenarios in which the speed of the wastegate valve is above a threshold, the winding resistance may be determined according to the relation described above ($R=(1/i)(V-L*(di/dt)+K*s)$).

Next, at 406 of the method, the determined winding resistance is stored and associated with the instant actuator position. The winding resistance and actuator position may be stored in various suitable data structures, including but not limited to a lookup table.

Next, at 408 of the method, it is determined whether a sufficient number of winding resistances have been determined. Here, the data structure in which the determined winding resistances are stored may be accessed to determine the number of winding resistances determined thus far. Various suitable numbers may be selected as a minimum number of winding resistances to ensure adequate characterization of the actuator winding resistance. Alternatively or additionally, a minimum angular range may be specified. In some examples, the data structure may be accessed to determine the rotational range of the rotor spanned by the determined winding resistances—in other words, throughout what portion of the rotor rotational range winding resistances have been determined. In some embodiments, winding resistances may be collected throughout the entire rotational range of the rotor (e.g., a full turn spanning 360°, a half-turn spanning 180°). Thus, the rotor position may be altered at 402 a number of times, and, as described above, by an appropriate step size (e.g., angle). The step size and number of samples may be selected according to operating conditions and an expected duration for which conditions conducive to winding resistance may persist, for example. Accordingly, if it is determined that the number of determined winding resistances is not sufficient (NO), the method returns to 402. If it is determined that the number of winding resistances is sufficient (YES), the method proceeds to 410.

At 410 of the method, the temperature of the actuator is estimated based on the determined winding resistances. Temperature estimation may include averaging the determined winding resistances in a suitable manner to form an averaged winding resistance. The averaged winding resistance may then be used to determine a winding temperature based on known properties of the winding material(s). A lookup table having a plurality of winding resistances each associated with a winding temperature may be accessed, for example.

Another method of measuring the resistance does not use the lookup table of wastegate position and resistance measurement. By averaging the voltage and current measurements over a period of time when the motor speed is slow enough, and rotor rotation is about K*360 degrees, where K is an integer, the resistance can be calculated directly from the averaged voltage and current. Many opportunities may arise during normal engine operating conditions to perform this measurement—e.g., when the wastegate is slowly approaching its seat, when requested to stay at a partial lift, and when requested to move to a high lift.

Next, at 412 of the method, it is determined whether the temperature of the actuator exceeds a threshold temperature. The threshold temperature may be set to a temperature above which a significant risk of degraded actuator operation exists—e.g., above the temperature threshold, a significant risk exists that the actuator may be unable to acceptably actuate the wastegate valve and control boost. If it is determined that the actuator temperature exceeds the temperature threshold (YES), the method proceeds to 414. If it is determined that the actuator temperature does not exceed the temperature threshold (NO), the method returns to 322 of method 300, resuming normal wastegate operation.

At 414 of the method, one or more actions are taken to prevent degraded wastegate control and potentially degraded boost control. The one or more actions may include, at 416, reducing (e.g., clipping) the current supplied to the wastegate actuator, which, in some scenarios, may include entirely ceasing current supply to the actuator. Accordingly, in some embodiments, a bias described above may be employed to maintain the wastegate valve in a position such that a non-zero level of boost may still be provided even without the supply of current to the actuator. The one or more actions may alternatively or additionally include, at 418, warning a vehicle operator, for example via a dashboard indicator or other mechanism.

Next, at 420 of the method, it is determined whether a threshold duration has passed. The threshold duration may be set such that the actuator temperature is afforded a chance to fall below the temperature threshold and resume normal operation. In some examples, the duration may be dynamically established in proportion to the amount the threshold temperature was exceeded—e.g., the threshold duration may increase as the amount by which the threshold temperature was exceeded. If it is determined that the threshold duration has not passed (NO), the method returns to 420. If it is determined that the threshold duration has passed (YES), the method returns to 402. Here, the process by which the actuator temperature is determined is repeated (e.g., steps 402, 404, 406, 408, and 410). To reduce the chance that the actuator temperature is caused to exceed the temperature threshold by estimating the temperature again (e.g., after the temperature threshold was previously exceeded), the number of rotor positions at which winding resistances are determined may be minimized. In some examples, a winding resistance at only one rotor position may be determined. In this example, the determined winding resistance and its associated actuator position may be compared with other winding resistances and their associated actuator positions to determine the extent to which the single winding resistance corresponds to an average winding resistance if two or more resistances were obtained. For example, such comparison may be used to lower the determined winding resistance if the single winding resistance corresponds to a higher than average winding resistance if a previously stored winding resistance having a similar rotor position was found to be higher than a respective average winding resistance.

Returning to FIG. 3, at 322 of method 300, having either determined that the actuator temperature exceeded the temperature threshold, with appropriate action taken in response, or having determined that the actuator temperature did not exceed the threshold, it is determined whether the actuator position is at the desired actuator position. Here, the sensed actuator position may be compared to the desired actuator position. In some embodiments, differences between the corrected actuator position and desired actuator position below a threshold may be ignored. If the actuator position is not at the desired actuator position (NO), the method returns to 314. If the actuator position is at the desired actuator position (YES), the method proceeds to 324.

At 324 of method 300, the current applied to the actuator is adjusted to maintain the desired valve lift and control the actuator position. The desired valve lift may be maintained via feedback and/or feed-forward control algorithms. For example, valve lift may be controlled via an inner control loop. Thus, the applied current is adjusted when the corrected actuator position reaches a position corresponding to a desired wastegate valve position.

Thus, as shown and described, methods 300 and 400 may be employed to reduce the potential for degraded wastegate actuator operation and degraded boost control due to excessive actuator temperature by determining winding resistance at operating regions where resistance measurements at multiple rotor positions may be obtained to increase the accuracy of temperature estimation without unacceptably affecting boost levels. The use of methods 300 and 400 may further offer the advantages of reduced cost and part count compared to approaches in which dedicated temperature sensors are used to determine actuator temperature.

FIG. 5 shows a graph 500 illustrating operating parameters of a wastegate arrangement of operated according to methods 300 and 400 of FIGS. 3A and 3B, and FIG. 4, respectively, for an exemplary drive cycle. Particularly, graph 500 includes a plot 502 of the lift of a wastegate valve (e.g., wastegate valve 218 of FIG. 2), varying between a fully open position (labeled "FO") and a fully closed position (labeled "FC"), and a plot 504 of the angle of a rotating element of a rotary actuator (e.g., actuator 202 of FIG. 2) actuating the wastegate valve. It will be appreciated that plots 502 are 504 are provided as examples and are not intended to be limiting in any way. For example, the relation between a given change in the angle of the rotary actuator and a corresponding change in valve lift is exaggerated for the sake of understanding. In some configurations, ten (or other order of magnitude) or more full turns (e.g., each turn being 360°) of the rotary actuator may be performed to move the wastegate valve throughout its full range (e.g., the distance between the fully closed position and the fully open position), for example.

As shown, the valve lift of the wastegate valve is initially placed at a partial lift position—e.g., between the fully open and fully closed positions. During this time the angle of the rotary actuator remains constant. From a time $t_1$ to a time $t_2$, a change in desired boost causes the valve lift to decrease toward the fully closed position, reaching a partial lift slightly away from the fully closed position at $t_2$. Accordingly, the angle of the rotary actuator fluctuates between 0 d and 360 d, making approximately three and a half turns. From time $t_2$ until a time $t_3$, the valve lift remains at the lower partial lift position. Accordingly, the angle of the rotary actuator may remain constant for the near entirety of this duration if the temperature estimation routines of methods 300 and 400 are not employed. However, the duration affords an opportunity to determine winding resistance of the rotary actuator and thereby estimate the temperature of the actuator. As such, the angle of the rotary actuator may be varied through a substantial portion of its rotational range (e.g., from 287° to 0°) with multiple resistance measurements performed throughout. As shown, three resistance measurements sampled during this time are represented by data points 506, which may be averaged for temperature estimation in the manners described herein. This optional action is represented via dashed lines in FIG. 5, showing how the actuator may be moved through this rotational range at a rate slower than that employed when the actuator is operated during normal wastegate operation. During this timeframe, the actual wastegate actuator position is altered (e.g., from the desired wastegate actuator position) even though the desired wastegate actuator position is maintained constant. In other scenarios, operating conditions may allow the full rotational range (e.g., 360°) of the actuator to be sampled. Plot 502 shows a corresponding change in valve lift in dashed lines due to rotation of the actuator. The change, however, is small enough to not unacceptably affect boost levels.

From time $t_3$ to a time $t_4$, the valve lift undergoes significant motion, moving from a partial lift proximate the fully closed position to a partial life proximate the fully open position. Accordingly, the rotary actuator is moved in a direction to increase the valve lift, undergoing several turns. At time $t_4$, however, the valve lift again remains constant at the higher partial lift, affording an opportunity for actuator temperature learning. Thus, as shown in dashed lines, the actuator may be rotated through a range of angles at a relatively slow rate to facilitate resistance measurements throughout the range and corresponding temperature estimation. Should temperature estimation not be employed, the actuator may remain at the same angle from $t_4$ onward, as shown in solid lines.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an electric wastegate actuator of a turbocharger in an internal combustion engine having a controller having non-transitory computer-readable storage medium, comprising:
determining a desired wastegate actuator position via the controller; and
adjusting an electric motor in responsive to the desired wastegate actuator position being determined via the controller,
wherein while adjusting the electric motor is further in responsive to any one of a determination of during selected conditions, deviating the wastegate actuator from the desired position by at least one full half-turn of the motor, and indicating a motor temperature determined based on winding resistance averaged over the full half-turn during the deviating via the controller.

2. The method of claim 1, further comprising compensating boost variation due to the deviation by adjusting an intake throttle, and wherein the deviating occurs only during the determined selected conditions.

3. The method of claim 1, wherein the selected conditions include maximum boost in which the wastegate actuator is placed at a fully closed position.

4. The method of claim 1, wherein the selected conditions include minimum boost in which the wastegate actuator is placed at a fully open position.

5. The method of claim 1, wherein during the selected conditions the desired wastegate actuator position is a constant partial lift.

6. The method of claim 1, wherein the selected conditions include the wastegate actuator approaching a fully closed position, the wastegate actuator including a wastegate valve coupled to the electric motor via a four-bar linkage.

7. The method of claim 6, wherein the selected conditions further include the wastegate actuator approaching the fully closed position at less than a threshold speed, the wastegate valve being moved through a full range via ten or more full turns of the electric motor.

8. The method of claim 1, wherein the selected conditions include the desired wastegate actuator position changing by less than a first threshold over a full rotation of the motor, the full rotation being at a speed less than a second threshold.

9. The method of claim 1, further comprising determining the winding resistance based on a voltage and current supplied to the motor.

10. The method of claim 1, wherein the winding resistance averaged over the full half-turn includes a plurality of winding resistances each associated with a respective motor position and stored in a data structure.

11. The method of claim 10, further comprising if the motor temperature exceeds a threshold, reducing current supplied to the motor.

12. The method of claim 11, wherein reducing the current supplied to the motor includes ceasing supply of the current to the motor.

13. The method of claim 1, further comprising if the motor temperature exceeds a threshold, warning a vehicle operator via a dashboard indicator.

14. The method of claim 1, further comprising if the motor temperature exceeds a threshold, indicating motor temperature based at least on one new winding resistance after a threshold duration has passed.

15. A method controlling an electric wastegate actuator of a turbocharger in an internal combustion engine having a controller having non-transitory computer-readable storage medium, comprising:
during a steady-state boost condition, adjusting a rotor of an electric wastegate actuator throughout at least a portion of a rotational range and measuring a voltage and a current corresponding to at least two rotor positions in the rotational range via the controller;
estimating a winding resistance of the electric wastegate actuator by averaging the voltages and currents corresponding to the at least two rotational rotor positions via the controller;
estimating a temperature of the electric wastegate actuator based on the estimated winding resistance via the controller;
reducing the current supplied to the electric wastegate actuator via the controller; and
actuating the electric wastegate actuator to maintain a wastegate valve in a position of a non-zero level of boost via the controller.

16. The method of claim 15, wherein the steady-state boost condition includes supply of maximum boost or approach to the maximum boost.

17. The method of claim 15, wherein the steady-state boost condition corresponds to a constant partial lift of a wastegate valve, the wastegate valve coupled to the electric wastegate actuator through a four-bar linkage, the wastegate valve being moved through a full range via ten or more full turns of the rotor.

18. The method of claim 15, further comprising ceasing supply of a current supplied to the electric wastegate actuator responsive to the temperature exceeding a threshold.

19. A method controlling an electric wastegate actuator of a turbocharger in an internal combustion engine having a controller having non-transitory computer-readable storage medium, comprising:
for durations in which a desired wastegate actuator position is constant, adjusting a wastegate actuator based on the desired wastegate actuator position via the controller;
after the wastegate actuator is adjusted to the desired wastegate actuator position, altering an actual wastegate actuator position through a rotational range of the wastegate actuator even though the desired wastegate actuator position is maintained constant via the controller;
determining a temperature of the wastegate actuator based on resistance measurements sampled at a plurality of actual wastegate actuator positions in the rotational range via the controller; and
adjusting an electric current supply in response to the temperature of the wastegate actuator having been determined via the controller.

20. The method of claim 19, further comprising:
ceasing the electric current supply to the wastegate actuator if the determined temperature of the wastegate actuator exceeds a threshold temperature via the controller;
determining a new temperature of the wastegate actuator based on at least one new resistance measurement after a threshold duration has passed via the controller; and
adjusting the electric current supply based on/in response to the new temperature of the wastegate actuator having been determined via the controller.

\* \* \* \* \*